United States Patent
Trago et al.

[11] Patent Number: 5,929,549
[45] Date of Patent: Jul. 27, 1999

[54] FAULT TOLERANT ELECTRIC MACHINE

[75] Inventors: Bradley A. Trago, Rockford, Ill.;
Robert E. Lordo, Fort Mill, S.C.

[73] Assignee: Pacific Scientific Company, Rockford, Ill.

[21] Appl. No.: 09/054,062

[22] Filed: Apr. 2, 1998

[51] Int. Cl.⁶ .................................................. H02K 3/00
[52] U.S. Cl. .......................... 310/198; 310/184; 310/149; 310/112; 310/202; 310/203; 310/197
[58] Field of Search .................................. 310/198, 184, 310/149, 112, 202, 203, 197

[56] References Cited

U.S. PATENT DOCUMENTS

| | | | |
|---|---|---|---|
| 2,805,373 | 9/1957 | Bonnell | 318/28 |
| 3,454,857 | 7/1969 | Farrand et al. | 318/166 |
| 3,586,942 | 6/1971 | McMahan | 318/254 |
| 3,679,956 | 7/1972 | Redmond | 318/564 |
| 3,866,099 | 2/1975 | Bourbeau | 318/254 |
| 3,921,017 | 11/1975 | Halleräck | 310/216 |
| 3,950,686 | 4/1976 | Randall | 318/564 |
| 4,035,699 | 7/1977 | Schade | 318/138 |
| 4,074,160 | 2/1978 | Broadway | 310/184 |
| 4,100,005 | 7/1978 | McNeal | 156/73.1 |
| 4,162,438 | 7/1979 | Osder | 318/564 |
| 4,434,389 | 2/1984 | Langley et al. | 318/254 |
| 4,550,267 | 10/1985 | Vaidya | 310/184 |
| 5,229,676 | 7/1993 | Bood | 310/114 |
| 5,486,731 | 1/1996 | Masaki et al. | 310/180 |

FOREIGN PATENT DOCUMENTS 2275054  9/1976  France ..................... 310/212

*Primary Examiner*—Nestor Ramirez
*Assistant Examiner*—Thanh Lam
*Attorney, Agent, or Firm*—Leydig, Voit & Mayer, Ltd.

[57] ABSTRACT

An electric machine, such as a motor or a generator, comprises a stator having a plurality of stator poles defining a plurality of slots, a rotor positioned within the stator, and at least a two sets of stator windings wound on the stator poles and occupying said stator slots such that the boundary windings of each set of stator windings occupies a common slot. These boundary windings of each set of stator windings are non-overlapping and include insulation positioned between them. The sets of stator windings are wound on the stator poles in a single pitch winding configuration significantly reducing the number of wire crossings resulting. In particular, the endturns defined by the individual phase coils are non-intersecting. Such a machine provides continued operation under various fault conditions.

20 Claims, 5 Drawing Sheets

○ – Phase A
△ – Phase B
◌ – Phase C

FAULT TOLERANT ELECTRIC MACHINE

FIELD OF THE INVENTION

This invention relates to electric motors and generators, and more particularly to electric motors and generators capable of continued operation during fault conditions.

BACKGROUND OF THE INVENTION

Continued advances in the design and manufacture of electric machines have enabled an increase in the types and number of applications which may take advantage of this technology. In particular, the use of electric machines, particularly electric motors and generators, in critical safety systems and medical and life support systems has been growing as a direct result of these advances. As can well be imagined, use of electric machines in these types of environments require a high level of reliability and, in many systems, a level of redundancy as well to prevent a single failure within the machine from causing a catastrophic failure in the overall system. In the past, it has not been uncommon for these systems to employ the use of multiple electric machines to ensure that the loss of any one machine would not result in a failure of the output and thus a catastrophic loss of the critical system.

However, as with all other areas of technology, there is a drive to reduce the size of the equipment used in these types of systems. Such a driving force no longer tolerates the crude systems of redundancy of the past which utilized multiple redundant machines to protect against a possible failure of one of them. In addition to requiring a larger physical size, these old systems of redundancy also were very expensive due to the requirement of having two or more physically separate electric machines.

In one area of technology of electric machines, that relating to electric motors and generators, a solution to the redundancy requirement, which has in the past been solved by having two separate electric motors or generators, has been found which does not require redundant machines to be used. In an electric motor or generator, the stator of the machine can be wound in such a manner to include multiple sets of stator windings. These multiple stator windings provide the redundant drive required to drive a given load, or the redundant source of electric power to supply multiple electric loads in the case of a generator configuration. Such a winding configuration allows for the use of a "single" electric motor or generator having a single rotor, a single stator, and a single housing, but utilizing multiple sets of stator windings to provide the required redundancy for the critical systems.

One such electric motor utilizing redundant windings is described in U.S. Pat. No. 4,434,389 issued to Langley et al. on Feb. 28, 1984, entitled MOTOR WITH REDUNDANT WINDINGS. In this patent, an electric motor is described which is wound with redundant sets of stator windings which are energized by independent electric circuits. This enables the operation of the motor even in the presence of a failure of a winding or any particular energization circuit. The electric machine described in this reference utilizes a distributed phase winding system for each set of stator windings. These sets of stator windings are physically separated, allowing for no overlapping of the windings between each separate set. The description of this patent distinguishes its redundant motor design from a conventional motor in which adjacent winding sets are allowed to overlap.

Another electric machine utilizing redundant stator windings to increase its fault tolerance is described in U.S. Pat. No. 4,550,267 issued to Vaidya on Oct. 29, 1995, for REDUNDANT MULTIPLE CHANNEL ELECTRIC MOTORS AND GENERATORS. As with the Langley et al. '389 patent, this patent also teaches the use of multiple redundant stator windings wound in a distributed winding configuration and having non-overlapping regions for the stator windings themselves. However, unlike the Langley et al. '389 patent, the redundant electric machine described in Vaidya '267 allows for a configuration where electromagnetic isolation may be compromised by allowing the windings within the two regions to overlap, although no description of such a configuration is included other than to mention is acceptability.

While the electric machines of each of the two above-referenced patents are directed at overcoming the requirement for separate electric machines to satisfy the redundancy requirements of critical systems, neither design is appropriate for the most highly critical applications, nor are they appropriate for use in the medical field. Specifically, each of the above referenced disclosures recognizes the problem of short circuits occurring within the stator windings as one of the failure conditions which necessitates the use of redundant stator windings. However, each of these references describe the use of a distributed wiring winding configuration used for each set of the distributed stator windings. Unfortunately, such a distributed wiring winding configuration significantly increases the probability of a phase-to-phase short circuit as will be described below with reference to FIG. 1.

FIG. 1 illustrates schematically a redundant electric machine 10 constructed in accordance with the teachings of the prior art utilizing a conventional distributed wiring winding configuration. This machine 10 requires a 24 slot stator 12, which is wound, in its simplest configuration, with two sets of stator windings 14, 16. The two halves are divided in FIG. 1 by the line 18 which has been included only to aid the understanding of this configuration, and does not represent any physical device actually included in this design. As may be seen even from this simplified schematic diagram, this distributed wiring winding configuration results in a significant number of phase wire crossings 20.

To determine the actual number of times that a phase wire crosses the wire from another phase, the types and number of wire crossings must be accounted for. The first type of wire crossing is the coil-to-coil crossing. In a three phase distributed wiring system there are six (6) wire crossings of this type. The number of crossings for each one of these crossings is the number of turns per coil for one phase times the number of turns per coil for the other phase. In a typical machine there will be 35 turns per coil. Therefore, the total number of coil-to-coil wire crossings is equal to $6(T_c*T_c)$ or 6(35*35) which equals 7,350 crossings.

The next type of wire crossing is that of an interpole loop to a coil. As with the coil-to-coil crossings, there are six (6) of these crossings. For each one of this type of crossing, the number of actual wire crossings is the number of turns per coil times the number of wires comprising the inter-pole loop. This is typically one (1). Therefore, the total number of inter-pole loop to coil wire crossings is equal to $6(T_c*T_{ipl})$ or 6(35*1) which equals 210 crossings.

The final type of wire crossing resulting from the distributed wiring system used in the prior art is the inter-pole to inter-pole wire crossings. Unlike the above types of crossings, there are only three (3) crossings of this type. Also, since typically only one wire is used to construct the inter-pole loop, the number of actual wire crossings for each of these is only one (1). Therefore, the total number of inter-pole to inter-pole wire crossings is equal to $3(T_{ipl})$ or 3(1) which equals three (3) crossings.

After having calculated each of the component types of wire crossings resulting from the distributed wiring system of the prior art, these numbers must be added together and multiplied by the number of redundant windings utilized and by the number of ends on the stator. The simplest example uses only two sets of stator windings, and has only two ends. Therefore, the final calculation of the number of wire crossings resulting from a distributed winding system for a redundant machine is (7,350+210+3)(2)(2), which equals 30,252 individual wire crossings.

Unfortunately, each one of these 30,252 wire crossings presents an opportunity for the development of a short circuit of these wires. While such probability may be reduced by increasing the insulation on these wires, such serves to unacceptably increase the cost of manufacture of such a machine. Additionally, the number of wire crossings increases substantially as additional sets of redundant stator windings are added, further increasing the probability of an inter-phase short circuit. This is an unacceptable result in a system which demands increased redundancy to prevent catastrophic failure of the system.

SUMMARY OF THE INVENTION

It is therefore an object of the instant invention to overcome at least some of these and other problems existing in the art. More specifically, it is an object of the instant invention to provide a new and improved electric machine capable of providing redundant operation while reducing the probability of introducing the very types of failures for which the redundancy is provided. It is a further object of the instant invention to provide an electric machine having redundant operating capability and a reduced cost of manufacture. Additionally, it is an object of the instant invention to provide a redundant electric machine having increased reliability over machines known in the art.

In view of the above and other objects of the instant invention which will become clear from the following description, it is a feature of the instant invention to provide an electric machine in the form of an electric motor or generator having redundant operating capabilities resulting in a minimized number of phase wire crossings. It is an additional feature of the instant invention to provide an electric machine wherein the individual phase coils are superiority isolated from each other as compared with known electric machines.

It is, therefore, an aspect of the instant invention to provide an electric machine having redundant operating capabilities whose individual phase coils cross only at the intra-pole loops, and not at the endturns of each coil thereby reducing the number of phase wire crossings, increasing the isolation between each of the individual phase coils, and reducing the potential for inter-phase short circuits. It is a further aspect of the instant invention that the windings from each set of redundant stator windings are allowed to occupy a shared common stator slot, but are not allowed to overlap one another. Additionally, it is an aspect of the instant invention to include isolation between windings from different redundant stator portions within the shared common stator slot to ensure electrical isolation therebetween.

In an embodiment of the instant invention, there is provided an electric machine, comprising a stator having a plurality of stator poles disposed around an inner periphery, and defining a plurality of slots therebetween. A rotor is rotatably disposed within the stator, and at least a first and a second set of stator windings are wound on the stator poles such that they occupy the stator slots. A boundary winding, existing on the boundary between the redundant sets of windings, from each set of redundant stator windings is allowed to occupy a common stator slot. These boundary windings are preferably non-overlapping with respect to one another. This machine further comprises insulation positioned between these boundary windings of the redundant sets of stator windings occupying the shared common stator slot. Preferably, this insulation comprises a layer of insulation positioned between the boundary windings, such as a layer of Nomex or other appropriate insulation.

In a preferred embodiment of the instant invention, the electric machine includes at least two sets of stator windings which are wound on the stator poles in a single pitch winding configuration. Both of these sets of stator windings preferably comprise a plurality of individual phase coils wound on the stator poles. These individual wound phase coils each define endturns at the ends where they wrap around the stator poles. In a preferred embodiment of the instant invention, the resulting endturns from each individual coil are preferably non-intersecting the endturns of other individual phase coils. In a highly preferred embodiment of the instant invention, the individual phase coils are wound on more than one stator pole and are connected by an intra-pole loop. In this configuration, only the intra-pole loops of the individual phase coils cross one another. No other portion of the windings cross any other portion of any other winding. Preferably, the individual phase coils are wound on the individual stator poles such that each slot is occupied by the individual phase coils wound on each of the adjacent stator poles, that is to say, each stator slot is occupied by two sets of winding.

In an alternate embodiment of the instant invention, an electric motor comprises a wound stator having two sets of non-overlapping, electrically isolated windings wound thereon, and a permanent magnet rotor rotatably disposed within the stator and coupled to a shaft for driving a load. The stator of this electric motor comprises a plurality of poles defining a plurality of slots therebetween, and each of the two sets of windings comprise a plurality of individual phase windings wound around these poles in non-overlapping fashion. Preferably, two of the individual phase windings occupy each of these slots.

Preferably, in an embodiment of the electric motor of the instant invention, at least one of the individual phase windings of one set of windings occupies a common slot with at least one of the individual phase windings of the other set of windings. These individual phase windings are preferably non-overlapping with one another, and preferably include a layer of isolation for preventing electrical short circuits therebetween. Each of the individual phase windings are preferably wound on more than one pole, and are coupled together by an intra-pole loop. For all of the individual windings, only the intra-pole loops overlap one another.

Additionally, a preferred method of increasing the reliability of an electric machine having a stator and a rotor rotatably positioned therein, in accordance with an embodiment of the instant invention, comprises the steps of: a) winding a first set of stator windings on a first portion of the stator in a non-overlapping, single-pitch fashion; b) winding a second set of stator windings on a second portion of the stator in a non-overlapping, single-pitch fashion; and c) electrically isolating the first set of stator windings from the second set of stator windings. Preferably, where the stator comprises a plurality of poles defining a plurality of slots therebetween, and where each set of stator windings comprises a plurality of individual phase windings, the preferred method further comprises the step of winding each individual phase winding on a given pole such that each slot is occupied by phase windings from each of the poles which define the slot.

These and other aims, objectives, and advantages of the invention will become more apparent from the following detailed detailed description while taken into conjunction with the accompanying drawings.

Figure 1:
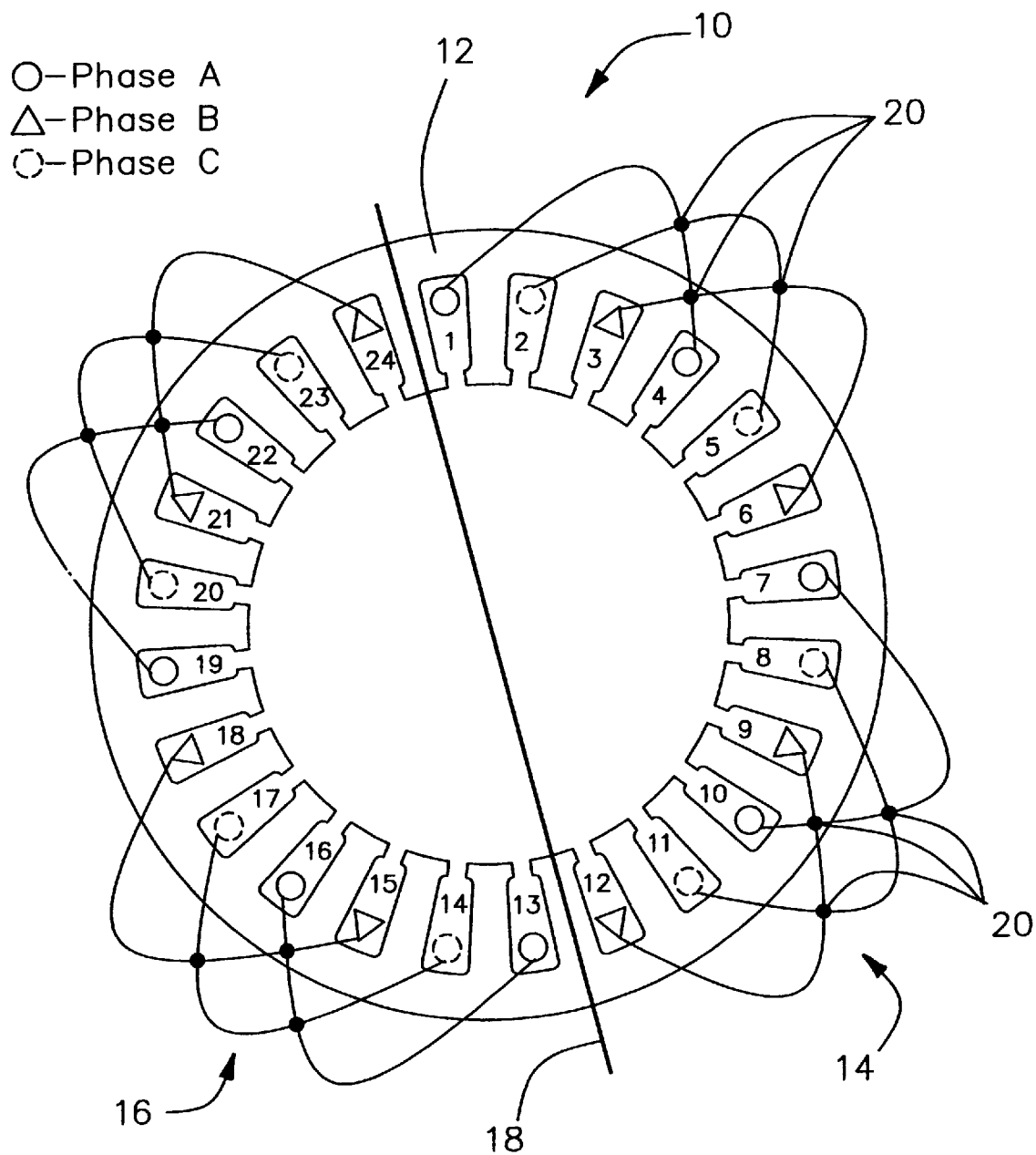
FIG. 1 is a schematic diagram illustrating a redundant electric machine utilizing a distributed wiring winding configuration in accordance with the teachings of the prior art.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

Figure 2:
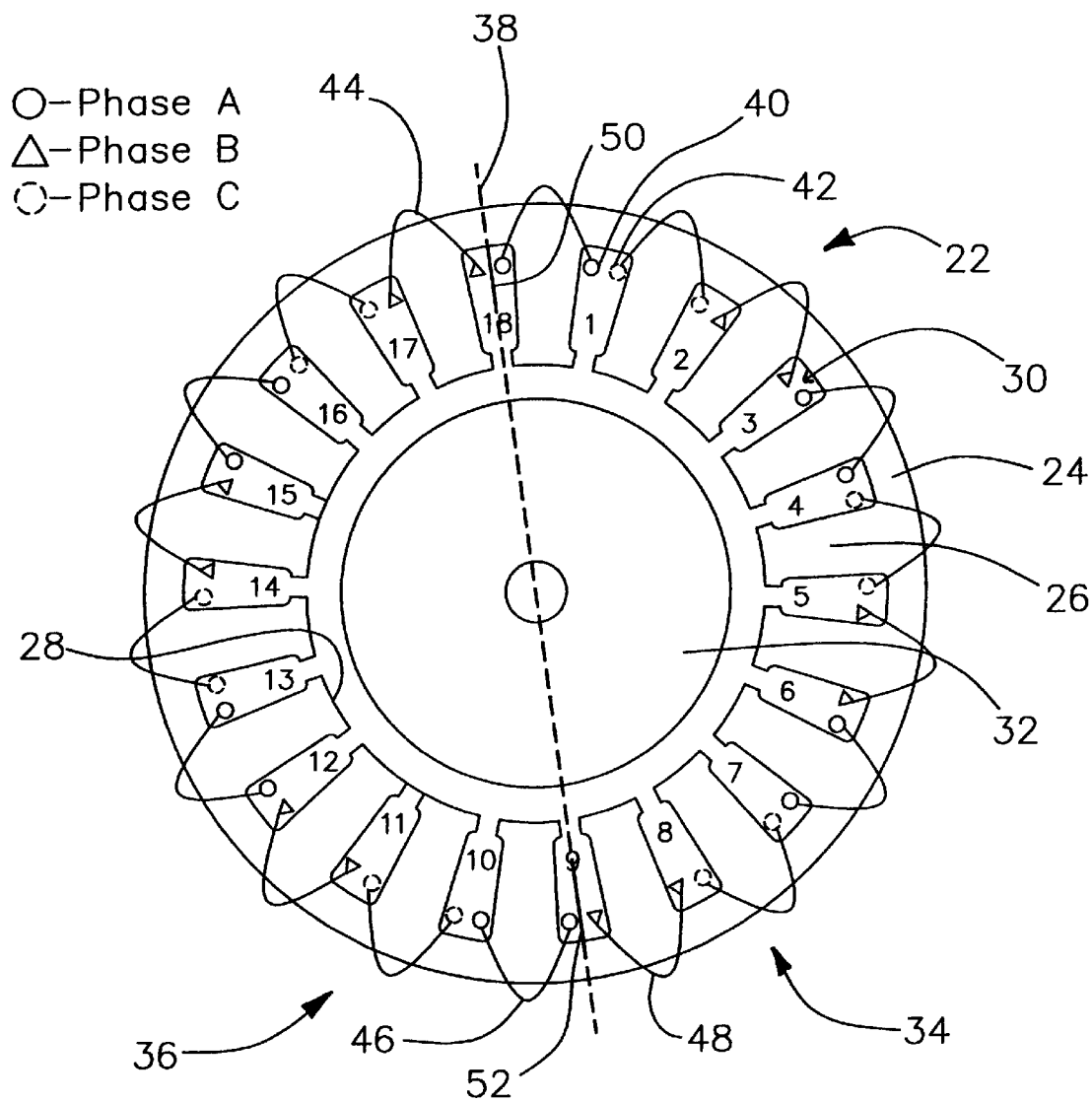
FIG. 2 is a schematic diagram illustrating a redundant electric machine constructed in accordance with the teachings of the instant invention.

A preferred embodiment to the instant invention is illustrated in simplified schematic form in FIG. 2. The electric machine of the instant invention, illustrated as a brushless DC motor 22 in FIG. 2 comprises of a stator 24 having a plurality of stator poles 26 which define an inner periphery 28 of the stator 24. The stator poles 26 define a plurality of slots 30 therebetween. In the embodiment illustrated in FIG. 2, the electric machine 22 includes a permanent magnet rotor 32 rotatably disposed within the periphery 28 of stator 24. The particular configuration of the electric machine 22 illustrated in FIG. 2 contains eighteen (18) stator slots 30, and is particularly well suited for the design of a dual redundant brushless DC electric motor. It should be noted, however, that while the foregoing and following description describes embodiments of the instant invention as brushless DC electric motors, one skilled in the art will readily appreciate that the teachings of the instant invention are equally applicable to electric generators as well as electric motors. Therefore, this description should be taken as exemplary only and should not be construed to be limited solely to electric motors.

As may be seen from the embodiment of the instant invention illustrated in FIG. 2, this DC brushless motor 22 contains two sets of stator windings 34, 36 wound on separate "hemispheres" of the stator, the separation therebetween indicated by dashed line 38. Within each hemisphere individual sets of phase windings are wound on each of the stator poles 26. The particular winding configuration utilized in this embodiment of the instant invention is a single pitch winding configuration wherein there are no wire crossings on the illustrated end of the stator 24. This single pitch winding configuration results in two separate windings, for example winding 40 and 42, which physically reside in a common shared slot in the stator 24. This shared slot residency is utilized throughout both hemispheres of the redundant machine, including the slot which houses the boundary windings 40, 44 and 46, 48 which exist at either end of the redundant windings at the boundary between hemispheres. While occupying the same physical slot, these boundary windings 40, 44, and 46, 48 are electrically isolated one from another by the inclusion of insulating means therebetween. Appropriate means for insulating these windings includes the insertion of a layer of Nomex or other suitable electric insulation positioned between these boundary windings. It will also be noted that, while these boundary windings 40, 44 and 46, 48 occupy the same physical slot on the stator, these windings do not overlap one another, maintaining the electrical isolation therebetween. Such a single pitch winding configuration allows for the stator 24 to be needle wound, thus greatly reducing the cost of manufacture of this machine.

Figure 3:
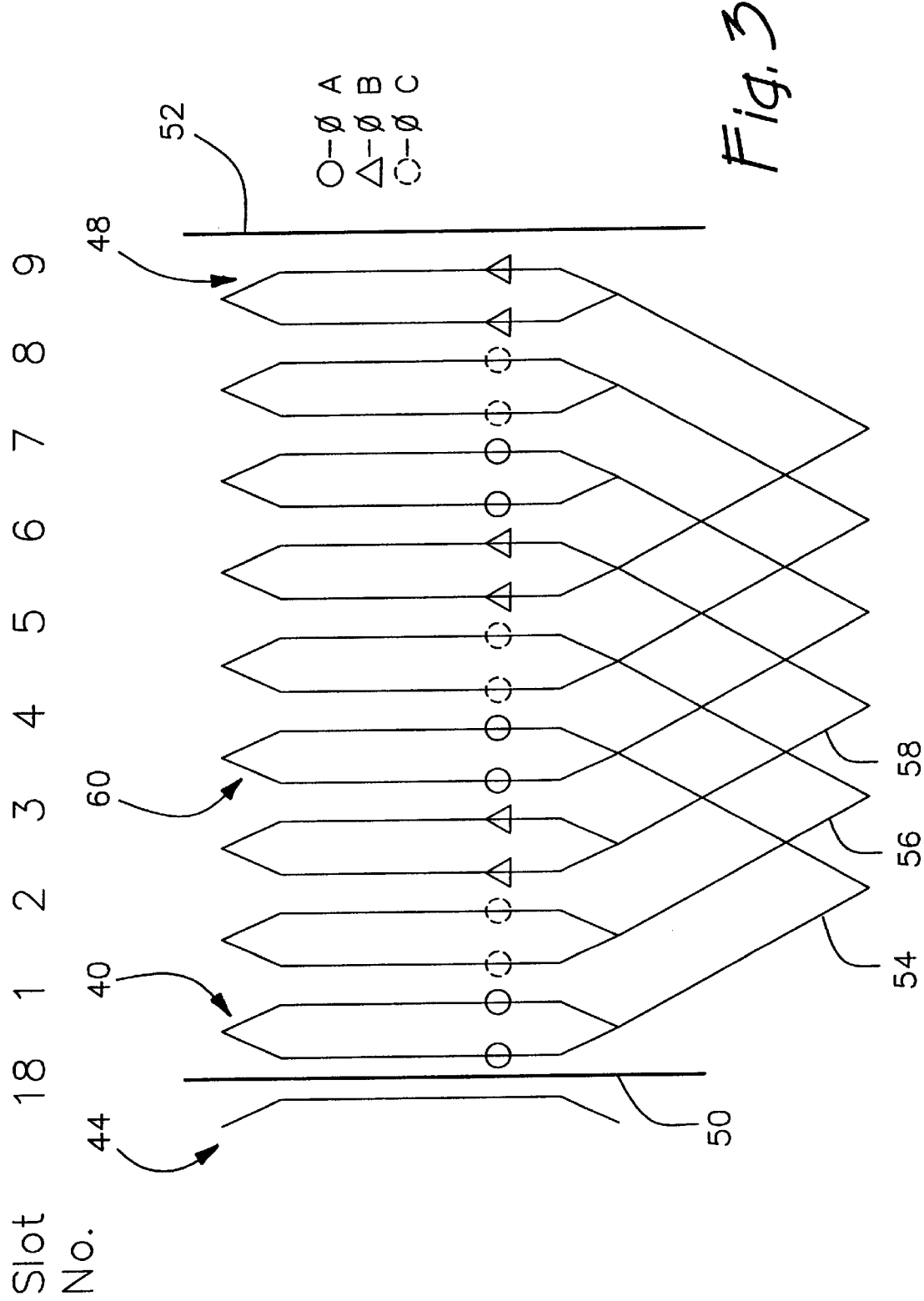
FIG. 3 is a schematic wiring diagram illustrating single pitch wiring in accordance with an aspect of the instant invention and suitable for the embodiment of the instant invention illustrated in FIG. 2.

To further illustrate and aspect of a preferred embodiment of the instant invention, reference is now made to FIG. 3. As may be observed, this figure is a schematic wiring diagram illustrating the single pitch wiring in accordance with an aspect of the instant invention and suitable for the embodiment of the instant invention illustrated in FIG. 2. The slot number designations illustrated in FIG. 3 correspond directly to the slot number designations utilized in the embodiment of the instant invention illustrated in FIG. 2. As may be seen from this figure, and as was briefly discussed above, the single pitch winding configuration utilized in a preferred embodiment of the instant invention results in no wire crossing on one end of the stator. The only wire crossings which do occur with this winding configuration are those resulting from the intra-pole loops 54, 56, and 58 which are utilized to couple individual phase coils of a given stator phase to other individual phase coils of the same stator phase on a given hemisphere. As may be observed from the single hemisphere illustration in FIG. 3, nine wire crossings are introduced by the inter-pole loops on each hemisphere of the electric machine of the instant invention, for a total of only eighteen (18) wire crossings for the entire redundant electric machine in accordance with an embodiment of the instant invention. It is a gross understatement to say that this is a significant reduction from the number of wire crossings which result in redundant electric machines constructed in accordance with the teachings of the prior art as discussed above. Specifically, the number of wire crossings, and thus the number of individual possible occurrences of a short circuit developing, is reduced from 30,252 resulting from the use of a distributed wiring winding configuration of the prior art, to 18 resulting from the single pitch winding configuration of the instant invention (nine for each hemisphere and on only one end of the stator as illustrated in FIG. 3). This drastic reduction in the number of wire crossings is facilitated by the inclusion of the entire individual phase coil on a single stator pole coupled only by an individual intra-phase loop to another self-contained individual phase winding on a separate stator pole. Use of such a winding configuration in accordance with the teachings of the instant invention greatly increases the reliability of such redundant machines, allowing them to be utilized in highly critical systems including life support and other medical equipment.

As a further aspect of an embodiment of the instant invention, the endturns 60 which are defined at the ends of the individual phase coils extending beyond the end of the stator 24 do not intersect the end turns of other individual phase coils as is the case with a distributed wire winding configuration utilized in the prior art.

Figure 4:
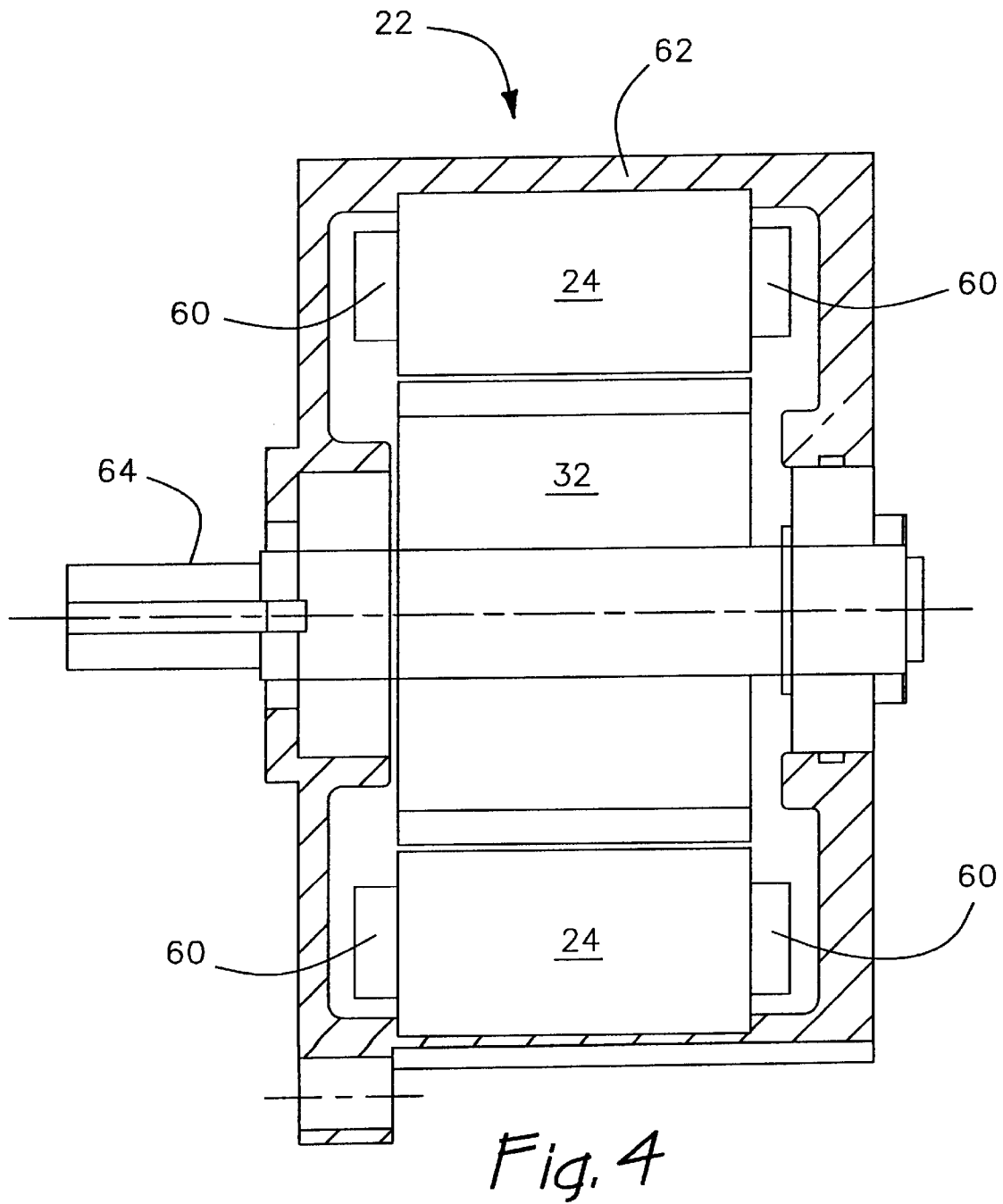
FIG. 4 is a cross-sectional illustration of an electric machine in accordance with an embodiment of the instant invention.

An embodiment of an electric machine constructed in accordance with the teachings of the instant invention is illustrated in cross-section in FIG. 4. This machine 22 includes a housing 62 through which extends a shaft 64 which is coupled to an external load (not shown) in the situation where the electric machine is operated as a motor, or to a source of rotational energy for the situation where the machine 22 is operated as a generator. Each of the two sets of stator windings are coupled to, in the case where the machine 22 is operated as a brushless DC motor, to sources of electric drive. These sources may be independent depending on the level of redundancy required by the system, and may continuously energize each set of redundant stator windings such that a loss of one set of stator windings does not impact the output operational characteristics of the shaft 64 below an accepted minimum.

Figure 5:
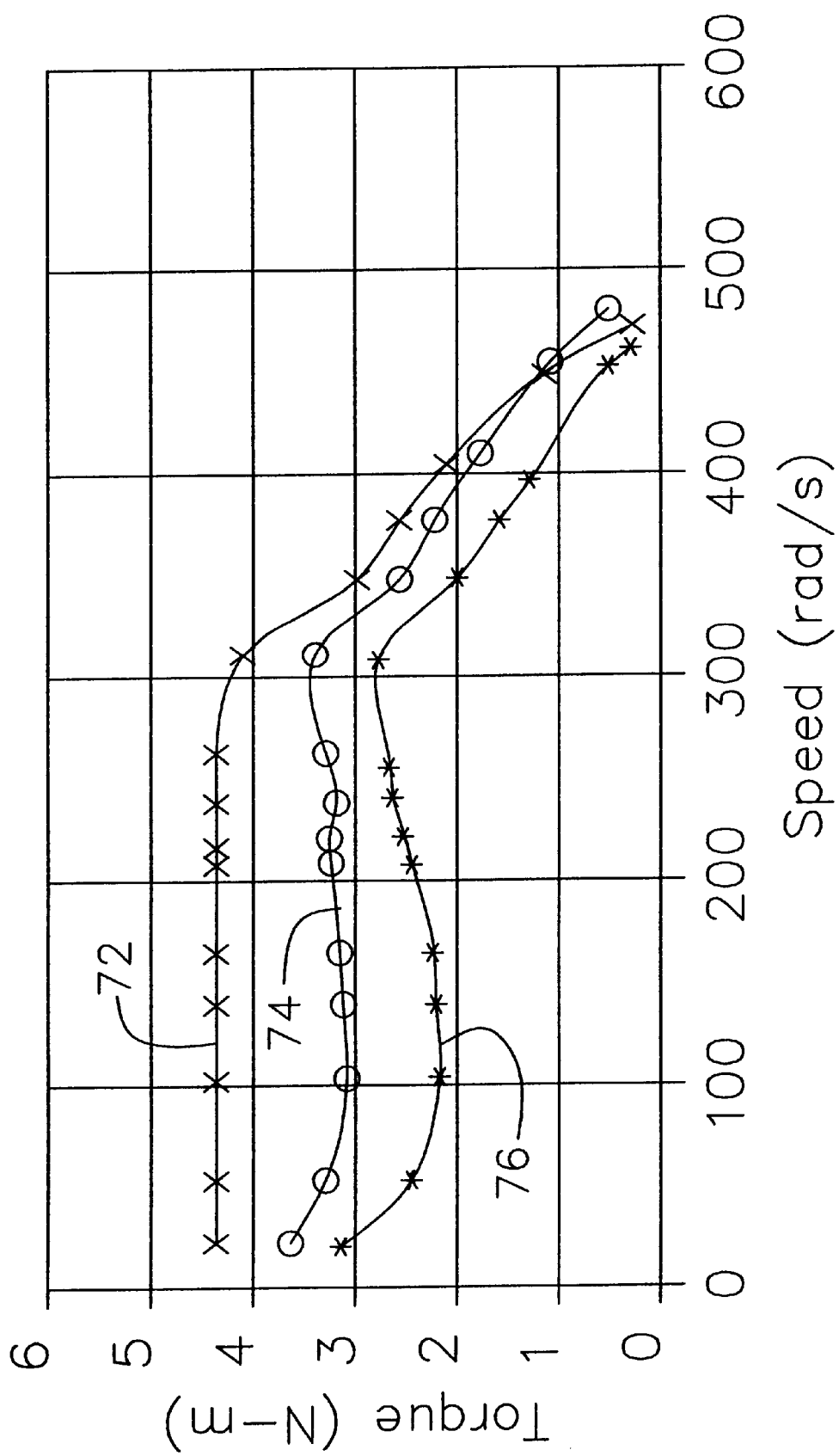
FIG. 5 is a fault operational performance chart illustrating redundant capabilities of an embodiment of an electric machine in accordance with the instant invention.

These output characteristics are illustrated for stator winding energization by a sine drive in FIG. 5, although is should be noted that other types of motor drives may be employed, such as a 6 step drive, with similar results. With reference to FIG. 5, there is illustrated the torque versus speed characteristics for an electric machine constructed in accordance with the teachings of the instant invention under various fault conditions with the redundant stator windings being energized by a sine drive. Trace 72 illustrates the output characteristics of a machine constructed in accordance with an embodiment of the instant invention having one of the sets of redundant stator windings open circuited (only one set of stator windings energized). Trace 74 illustrates the output characteristics of the same machine operating under the condition where a single phase to phase short circuit exists in one of the sets of stator windings. Trace 76 illustrates the output characteristics of the same machine having one hemisphere normally energized, while the second hemisphere contains a three phase short circuit.

As may be apparent to one with ordinary skill in the art from the foregoing description, an electric machine, whether configured to operate as a motor or a generator, constructed in accordance with the teachings of the instant invention, greatly reduces the manufacturing time and cost of the machine while at the same time greatly increasing the reliability due to the decreased number of wire crossings resulting from the stator windings. Additionally, such a machine provides higher performance due to the decreased $I^2R$ losses in the endturns. Additionally, unlike electric machines constructed in accordance with the teachings of the prior art, there is no need to cut notches in the laminations to allow for wire routing. This allows for better performance per unit volume and unit mass of the machine.

While the above description of the instant invention was directed to an exemplary embodiment of the instant invention configured as a hemispherically wound DC brushless electric motor, one skilled on the art will readily understand that the teachings of the instant invention are applicable to electric machines having increased levels of redundancy. Specifically, the teachings of the instant invention may be embodied in electric machines having three, four, or more individual sets of stator windings as may be appropriate for the system requirements. Additionally, these separate redundant sections may or may not occupy equal portions of the stator as desired. It should be noted that while the above description utilizes the phrase "critical" system, one skilled in the art will recognize the applicability of the instant invention to any system where redundant operation is desired, critical or not. As will be recognized, the appropriate number of poles and slots for these alternate embodiments may differ in number from the single redundant, hemispherically wound electric machine described above. Likewise, the number stator poles and slots may also be varied from the illustrated embodiment for a hemispherically wound stator as desired.

As the above description illustrates, the teachings of the instant invention provide a method of increasing the reliability of an electric machine to enable its use in highly critical systems including life support systems and other medical systems where reliable fail-safe operation is required or desired. Therefore, a method of increasing the reliability of an electric machine having a stator and a rotor such as an electric motor or generator, comprises the steps of a) winding a first stator windings on a first portion of the stator in a non-overlapping, single pitch fashion; b) winding at least a second set of stator windings on a second portion of the stator, also in a non-overlapping, single pitch fashion; and c) electrically isolating the first set of stator windings from the second set of stator windings. Furthermore, where the stator comprises a plurality of poles defining a plurality of slots therebetween, and where each set of stator windings comprise a plurality of individual phase windings, a preferred method in accordance with the teachings of the instant invention further comprises the step of winding each individual phase winding on a given pole such that each slot is occupied by phase windings from each of the poles which defines the slot.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. The details of the structure and architecture may be varied substantially without departing from the spirit of the invention, and the exclusive use of all modifications which come within the scope of the appended claims is reserved.

What is claimed is:

1. An electric machine, comprising:
   a stator having a plurality of stator poles disposed around an inner periphery thereof, aid stator poles defining a plurality of slots therebetween;
   a rotor rotatably disposed within said stator; and
   at least a first and a second set of stator windings wound on said stator poles and occupying said stator slots, said at least first and second sets of stator windings occupying separate regions of said stator; and
   wherein a boundary winding of said at least first and second set of stator windings occupies a common slot.

2. An electric machine, comprising:
   a stator having a plurality of stator poles disposed around an inner periphery thereof, said stator poles defining a plurality of slots therebetween;
   a rotor rotatably disposed within said stator; and
   at least a first and a second set of stator windings wound on said stator poles and occupying, said stator slots; and
   wherein a boundary windings of said at least first and second set of stator windings occupies a common slot; and wherein said boundary windings of said at least first and second set of stator windings are non-overlapping.

3. The electric machine of claim 1, further comprising insulation means positioned between said boundary windings of said at least first and second set of stator windings for electrically isolating said boundary windings of said at least first and second set of stator windings.

4. The electric machine of claim 3, wherein said insulation means comprises a layer of insulation positioned between said boundary windings.

5. The electric machine of claim 4, wherein said layer of insulation comprises a layer of Nomex insulation.

6. The electric machine of claim 1, wherein said at least first and second set of stator windings are wound on said stator poles in a single pitch winding configuration.

7. The electric machine of claim 1, wherein said at least first and second set of stator windings comprise a plurality of individual phase coils wound on said stator poles, said individual phase coils defining endturns at the ends thereof, said endturns of said individual phase coils non-intersecting said endturns of other individual phase coils.

8. The electric machine of claim 1, wherein said at least first and second set of stator windings comprise a plurality of individual phase coils, each of said individual phase coils being wound on more than one stator pole and connected by an inter-pole loop, and wherein only said inter-pole loops of said individual phase coils crossing one another.

9. The electric machine of claim 1, wherein said at least first and second set of stator windings comprise a plurality of individual phase coils wound on said individual stator poles such that each slot is occupied by individual phase coils wound on each of said stator poles defining said slot.

10. The electric machine of claim 1, wherein said at least first and second set of stator windings comprise a plurality of individual phase coils wound on said individual stator poles such that each slot is occupied by two individual phase coils.

11. An electric motor, comprising:
a wound stator having two sets of non-overlapping, electrically isolated windings wound thereon; and
a permanent magnet rotor rotatably disposed within said stator and coupled to a shaft for driving a load.

12. The electric motor of claim 11, wherein said stator comprises a plurality of poles defining a plurality of slots therebetween, and wherein each of said two sets of windings comprise a plurality of individual phase windings wound around said poles in non-overlapping fashion.

13. The electric motor of claim 12, wherein two of said individual phase windings occupy each of said slots.

14. The electric motor of claim 13, wherein at least one of said individual phase windings of one set of windings occupies a common slot with at least one of said individual phase windings of the other set of windings.

15. The electric motor of claim 14, wherein said at least one of said individual phase windings of one set of windings and said at least one of said individual phase windings of the other set of windings occupying a common slot are non-overlapping with one another.

16. The electric motor of claim 15, further comprising electrical isolation means positioned between said at least one of said individual phase windings of one set of windings and said at least one of said individual phase windings of the other set of windings occupying a common slot for preventing electrical short circuits therebetween.

17. The electric motor of claim 16, wherein said electrical isolation means comprises a layer of Nomex.

18. The electric motor of claim 17, wherein each of said individual phase windings are wound on more than one pole, wherein each of said individual phase windings wound on more than one pole are coupled together by an inter-pole loop, and wherein only said inter-pole loops overlap one another.

19. A method of increasing the reliability of an electric machine having a stator and a rotor rotatably positioned therein, comprising the steps of:
winding a first set of stator windings on a first portion of the stator in a non-overlapping, single-pitch fashion;
winding a second set of stator windings on a second portion of the stator in a non-overlapping, single-pitch fashion, said second portion being exclusive of said first portion; and
electrically isolating the first set of stator windings from the second set of stator windings.

20. The method of claim 19, wherein the stator comprises a plurality of poles defining a plurality of slots therebetween, and wherein each set of stator windings comprise a plurality of individual phase windings, further comprising the step of winding each individual phase winding on a given pole such that each slot is occupied by phase windings from each of the poles which define the slot.

* * * * *